UNITED STATES PATENT OFFICE.

BYRON B. GOLDSMITH, OF NEW YORK, N. Y.

COMPOSITION OF MATTER AND PROCESS OF MAKING SAME.

1,188,439. Specification of Letters Patent. Patented June 27, 1916.

No Drawing. Original application filed January 10, 1913, Serial No. 741,158. Divided and this application filed December 9, 1914. Serial No. 876,356.

*To all whom it may concern:*

Be it known that I, BYRON B. GOLDSMITH, a citizen of the United States, residing at New York, in the county of New York and State of New York, have invented certain new and useful Improvements in Composition of Matter and Processes of Making Same; and I do hereby declare the following to be a full, clear, and exact description of the invention, such as will enable others skilled in the art to which it appertains to make and use the same.

My invention relates to a certain composition of matter which may be used either for molding into shapes or dissolved in an appropriate solvent as a coating or varnish, and this application is a division of my application, Serial Number 741,158, filed January 10th 1913, wherein I have described and claimed the process hereinafter described.

The composition of matter herein described can be used in a manner well known in connection with artificial resins, for impregnating suitable substances before the final condition is reached for which the substance is intended.

My present invention also relates to a varnish and process of making the same by use of the composition of matter aforesaid.

I have discovered that, on heating together a phenol with the formaldehyde compound of an amin, a reaction takes place with the formation of useful products varying among themselves according to the particular phenol and amin employed. As an example: I can take ordinary phenol $C_6H_5OH$ and heat it with anhydro-formaldehyde-anilin. There is produced a soft resinous mass which becomes progressively harder on further heating. Instead of using phenol and anhydro-formaldehyde-anilin in their natural state they can be used in solution, and by heating such solutions a condensation product can be formed. The reaction between phenol and anhydroformaldehydeanilin seems to start before heat is applied, as even in the cold if phenol is added to anhydroformaldehydeanilin, which is a solid, the entire mass liquefies. Anilin is liberated during the reaction and this can, if desired, be entirely or partly removed by suitable means at the proper stage, thus giving a harder resin. No special apparatus need be used to bring about the reaction as it takes place by heating in an open vessel. The compound can be dissolved in proper solvents, such as acetone, and used for a varnish. The proportions in which the ingredients are mixed will vary according to the particular phenol and other ingredient used, and the most suitable proportion for each case can be best determined by experiment.

I have found that a compound having the qualities specified may be readily produced by heating together one part, by molecular weight, of carbolic acid with one part, by molecular weight, of (for instance) anhydroformaldehydeanilin. This reaction can be carried out with the formaldehyde compounds of the amins of the fatty as well as the aromatic series. Methylamin and anilin are the first members of each series. The formaldehyde compound of methylamin is methylmethyleneamin and the formaldehyde compound of anilin is anhydroformaldehydeanilin. I have chosen these two amins as examples to show that notwithstanding the great differences between them, methylamin being a gas and anilin a liquid, the formaldehyde compound of each is suitable for the reaction. In the same manner I can use the formaldehyde compound of other amins such as ethylamin, prophylamin, toluidin, xylidin, etc.

It is to be understood that in the claims wherever a phenol is called for, the expression is intended to cover not only ordinary phenol, but other phenols such as guaiacol, resorcin, alpha and beta naphthol, pyrogallol, and in fact any compound of this character which has the property of uniting with the methylene group of the compound formed by reacting upon an amin with formaldehyde. On heating the compounds formed as above described they become harder and more insoluble, and they are well adapted for molding under heat and pressure, with or without the admixture of other substances as is well understood in the art, and in fact, they can be put to all the uses which such substances have been found adapted to.

As mentioned above, any amin which is liberated during the reaction can be partly or entirely removed at the proper stage, and it is sometimes desirable to remove it and sometimes not, depending upon the properties desired in the final product.

My claims for the compound are independent of the particular process used in producing it, and of whether or not the by-products (such as liberated amins) are incorporated.

What I claim is—

1. The process of making a varnish which consists in producing a resinous mass by the reaction of a phenol in the presence of heat upon a definite formaldehyde compound of an amin, and dissolving said mass in a solvent.

2. The process of making a varnish which consists in producing a resinous mass by the reaction of carbolic acid and anhydroformaldehydeanilin in the presence of heat and dissolving said mass in a solvent.

3. A varnish consisting of a solution of a resin formed by heating together a phenol and a definite compound of formaldehyde and an amin.

4. A varnish consisting of a solution of a resin formed by heating together carbolic acid and a definite compound of formaldehyde and an amin.

5. A varnish consisting of a solution of a resin formed by heating together carbolic acid and anhydroformaldehydeanilin.

6. A varnish consisting of a solution in acetone of the resin formed by heating together carbolic acid and anhydroformaldehydeanilin.

In testimony whereof, I affix my signature, in presence of two witnesses.

BYRON B. GOLDSMITH.

Witnesses:
 FRANK DREWS,
 FRANK J. MRAZ.